METHOD OF MANUFACTURING ELECTRICAL CONNECTORS

Filed Aug. 1, 1966 Sheet 1 of 3

INVENTORS.
EUGENE G. FREEHAUF,
WILLIAM P. DUGAN

By L E Carnahan
AGENT

INVENTORS.
EUGENE G. FREEHAUF,
WILLIAM P. DUGAN,
By L E Carnahan
AGENT.

INVENTORS.
EUGENE G. FREEHAUF,
WILLIAM P. DUGAN,
By L E Carnahan
AGENT.

United States Patent Office 3,431,641
Patented Mar. 11, 1969

3,431,641

METHOD OF MANUFACTURING ELECTRICAL CONNECTORS

Eugene G. Freehauf and William P. Dugan, Ontario, Calif., assignors to General Dynamics Corporation, a corporation of Delaware Filed Aug. 1, 1966, Ser. No. 569,469
U.S. Cl. 29—625 10 Claims
Int. Cl. H05k 3/20, 3/30

ABSTRACT OF THE DISCLOSURE

A method of making integral conductor paths and through-hole tube-like elements (unitubes) in a single-layer and multi-layer positioner boards on which components are to be mounted. Temporary backing material is applied to the board or boards having at least one circuit thereon; the desired circuit path or paths is formed on the boards; holes are formed through the assembly in desired locations; the holes are through-plated along with at least certain of the circuits; and finally the backing material is stripped away along with a portion of the plating to leave through-hole tube-like elements extending from the positioner board or boards and integral with the desired circuits therein.

This invention relates to electrical connectors, and more particularly to a method of fabricating electrical connectors utilized to interconnect various elements of electrical or electronic apparatus which utilize single or multi-layer circuits.

Devices which serve as a media for attaching electronic components to a circuit in single or multi-layer apparatus, such as 3-D module construction, are known. The end result of such devices is a series of circuits on at least one positioner or carrier board with tube-like elements at appropriate places in continuity with these circuits. The function of these tube-like elements is to receive electronic component leads so that they may be connected to the circuits as used in module construction, for example, U.S. Patent 3,209,066 exemplifies such known devices.

The present invention is an improvement of the manufacturing methods described and claimed in U.S. patent applications 408,283 and 413,689, now Patents Nos. 3,370,351 and 3,396,459 respectively, and assigned to the same assignee. This invention has for its purpose an improved method of fabricating the above described devices for single-layer and multi-layer circuits, and has the following advantages: (1) the tube-like elements (unitubes) are fabricated as an integral part of the positioner board and are stronger units and will stand more abuse; (2) there is no chance of mismatch between the hole in the positioner board and the tube as they are one and the same; (3) no "hard tooling" is necessary for limited production as all circuits and tube-like element locations can be transposed directly from engineering drawings; (4) the tube-like element height is easy to control because it originates from stable material and a variation in heights, for different applications, can be made easily; and (5) the tube-like element diameters can be varied to accept different size component leads.

Therefore, it is an object of this invention to provide a method of manufacturing electrical connectors.

A further object of the invention is to provide an improved method of manufacturing devices which serve as a media for attaching electronic component leads in single-layer and multi-layer circuits.

Another object of the invention is to provide an improved fabricating method for producing single-layer and multi-layer carrier boards with integral electronic connector devices.

Another object of the invention is to provide an improved method for fabricating devices which contain single-layer or multi-layer carrier boards with tube-like elements integral therewith and located at appropriate places in continuity with desired circuit paths on the carrier boards.

Other objects of the invention, not specifically set forth above, will become readily apparent from the following description and accompanying drawings wherein.

Broadly, the invention relates to an improved method of making integral conductor paths and through-hole tube-like elements (unitubes) in single-layer and multi-layer positioner boards on which components are to be mounted. According to this invention, temporary backing material is applied to the board or boards having at least one circuit thereon; the desired circuit path or paths is formed on the boards; holes are formed through the assembly in desired locations; the holes are through-plated along with at least certain of the circuits; and finally the backing material is stripped along with a portion of the plating to leave through-hole tube-like elements extendign from the positioner board or boards and integral with the desired circuits therein.

Figures 1, 2, 3, 4, 5, 6, 7:
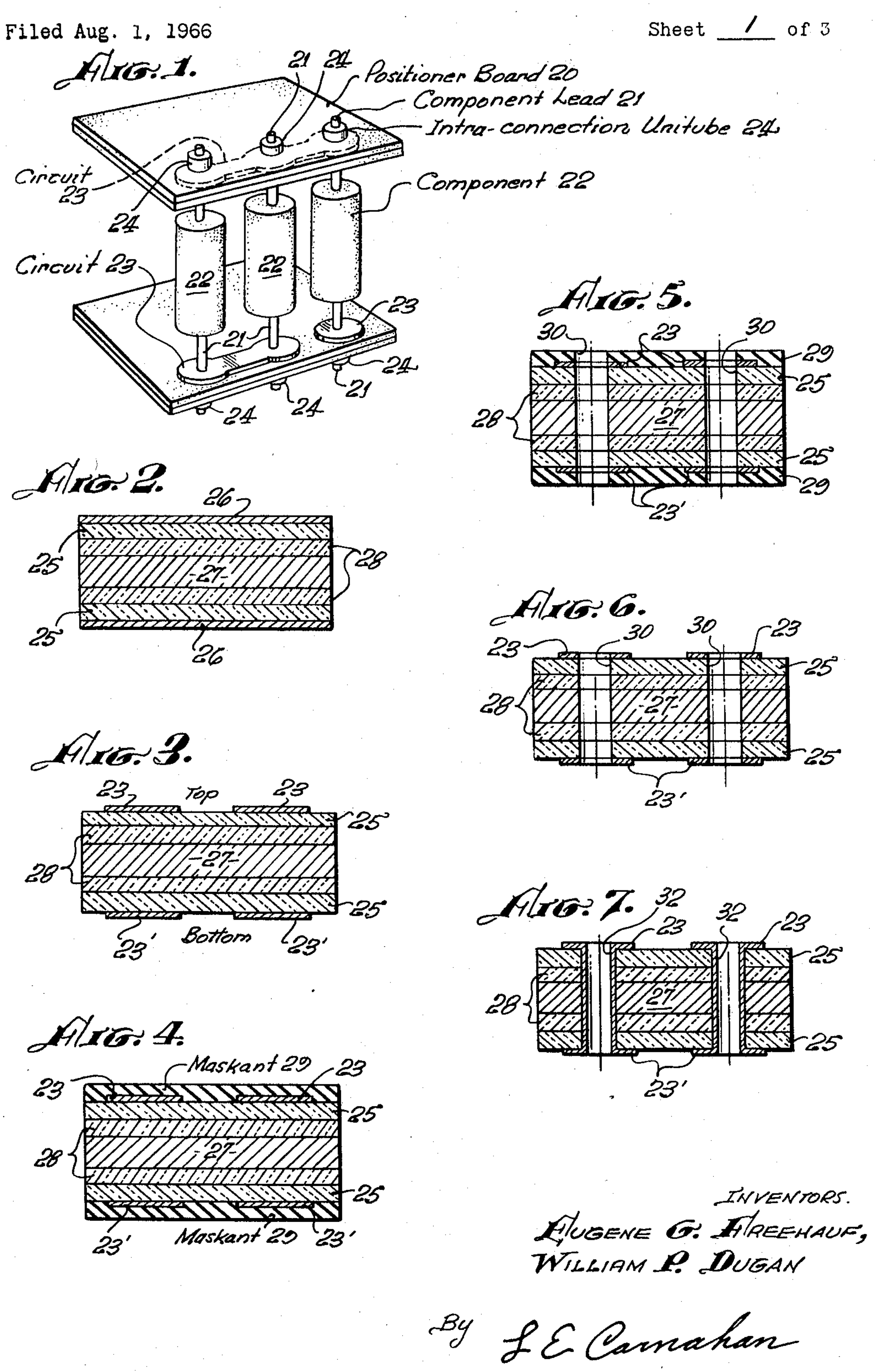
FIG. 1 is a view illustrating an application of single-layer electrical connectors made in accordance with this invention.
FIGS. 2–9 illustrate the steps of the improved method for fabricating the single-layer connectors of FIG. 1.

Referring now to the drawings, FIG. 1 illustrates an application of the single-layer integral tube-like elements made in accordance with the inventive steps illustrated in FIGS. 2–10 wherein positioner boards 20 are intra-connected with leads 21 of a plurality of components 22. Integral with each board 20 is at least one circuit path 23 interconnecting certain of the component leads 21 and intra-connection tube-like elements (unitubes) 24 of material such as nickel through which component leads 21 extend. The circuit path 23 in the upper board is underneath the board as shown in dotted lines while the connection tube-like elements 24 in the lower board extend under the board. Component leads 21 and tube-like elements 24 are interconnected by welding across the diameter of the elements which provides two welded areas at the inside interfaces of the wall of the tube-like elements and the component lead thus giving greater reliability over the single tangential weld obtained with the conventional interconnection methods. Also, with this type of connection, the welder electrodes are normally in contact with the same type of material, namely, the tube-like element wall, regardless of the type of material from which the component leads are made. If desired, the leads 21 and tube-like elements (unitubes) 24 may be interconnected by soldering instead of welding.

The sequence of primary steps of the operation of carrying out the improved fabrication method of the single-layer unitube, partially illustrated in FIGS. 2–10, is as follows:

(1) Bond two sheets of "A" stage epoxy glass insulation material 25 having one copper clad side 26 to an aluminum sheet 27 having the same thickness as the height of the desired unitubes 24 (see FIG. 2), using two sheets of "B" stage glass epoxy insulation material 28 as the bonding agent. The copper clad sides 26 being located on the outside of the assembly.

(2) Using photo fabrication (KPR) techniques, form the desired circuits 23 and 23′ (see FIG. 3) from the copper clad sides 26 of sheets 25. The top circuit 23 is the actual circuit while the bottom circuit 23′ functions as a dummy circuit for electroplating control. This step may be performed prior to the bonding procedure of step 1 above, if desired.

(3) Apply neoprene maskant 29 to the top and bottom surfaces of the bonded assembly as shown in FIG. 4. Trim from edges as necessary.

(4) Drill holes 30 of appropriate size (approximately 0.014 inch larger than the inside diameter of the desired unitube 24) through the bonded assembly at those places requiring a unitube in the circuit (see FIG. 5). Clean the thus drilled holes.

(5) Electro-copper plate the exposed aluminum surfaces of sheet 27 in holes 30 by a pyrophosphate process to a thickness of approximately 0.0006 inch.

(6) Sensitize the exposed plastic surfaces (maskant 29 and the surfaces of holes 30 in epoxy glass layers 25 and 28) by immersion in a suitable conventionally known catalyst.

(7) Remove maskant 29 from all surfaces as shown in FIG. 6.

(8) Electroless copper plate all sensitized surfaces of the holes in layers 25 and 28, the exposed copper surfaces of holes 30 in aluminum layer 27, and the exposed circuit paths 23 and 23′ to a thickness of about 0.0001 inch.

(9) Electro-copper plate all exposed copper surfaces to define a copper layer 31 (see FIG. 10) having a thickness of about 0.0002 inch.

Figure 10:
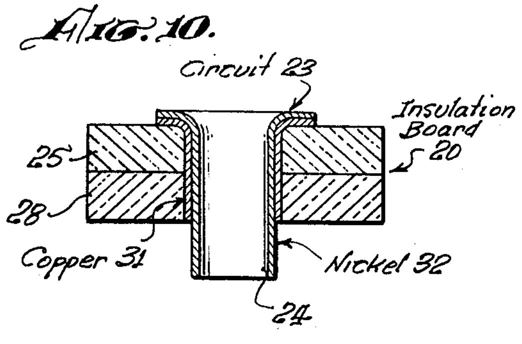
FIG. 10 is an enlarged cross-sectional view of a single-layer end item made in accordance with the method outlined by FIGS. 2–9.

(10) Electro-nickel plate all exposed copper surfaces to define a nickel layer 32 having a thickness of approximately 0.004±0.001 inch (see FIGS. 7 and 10).

Figure 8:
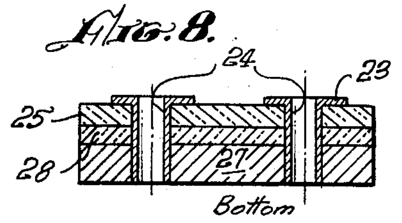

(11) Remove bottom circuits 23′ and adjacent epoxy layers 25 and 28 to expose the aluminum sheet 27 as shown in FIG. 8. This may be accomplished, for example, by sanding. Remove burrs from the exposed surface and from the ends of the unitube walls.

Figure 9:
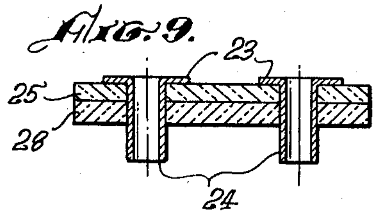

(12) Dissolve aluminum layer 27 by immersing in sodium hydroxide (see FIG. 9).

(13) Remove exposed copper layer 31 from the outside wall surface of the unitubes 24 (see FIG. 10) by a conventional copper stripping procedure. For example, by immersing in a copper stripper.

The above process produces the final product comprising unitube 24, constructed essentially of nickel, integral with circuit 23 and secured to insulation board 20 as shown in FIG. 10. The configuration of the circuit path or paths 23 and the location of the tube-like elements (unitubes) 24 is determined by the specific requirements, number of component leads, etc., of any specific application.

While not specifically set forth, required cleaning and/or rinsing step where appropriate are included in the process.

Figure 11:
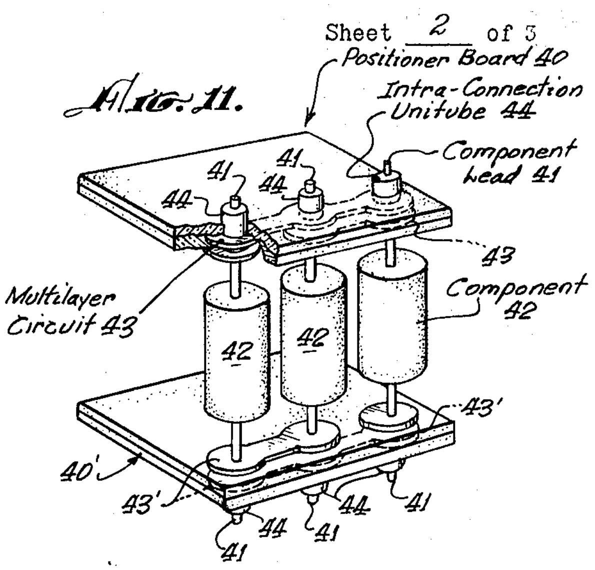
FIG. 11 is a view illustrating an application of multi-layer electrical connectors produced by the invention.

Referring now to FIG. 11 which illustrates an application of the multi-layer integral tube-like elements made in accordance with the inventive steps illustrated 12–21 wherein positioner boards 40 and 40′ are intra-connected with leads 41 of a plurality of components 42. Integral with each board 40 and 40′ are multi-layer circuits indicated generally at 43 and 43′, respectively, which are interconnected to certain of component leads 41 via intraconnection tube-like elements (unitubes) 44, elements 44 being made of material such as nickel through which component leads 41 extend. The circuits 43 in the upper board 40 are defined by one layer on the bottom of the board and one layer in the center of the board as shown in dotted lines, while the circuits 43′ in the lower board 40′ comprise an internal layer shown in dotted lines and an external layer on top of the board.

As in the single layer embodiment, the component leads 41 and unitubes 44 are interconnected by welding across the diameter of the tube which provides two welded areas at the inside interfaces of the wall of the unitube and the component lead thus giving greater reliability over the single tangential weld obtained with conventional methods. Also, as previously set forth, the welder electrodes are normally in contact with only one type of material, namely, the unitube wall.

Figure 12:
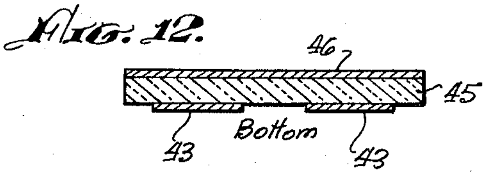
FIGS. 12–20 illustrate the steps of the improved method for fabricating the multi-layer connectors of FIG. 11.

The sequence of the primary step of the improved method for manufacturing the FIG. 11, multi-layer, partially illustrated in FIGS. 12–21, is as follows:

(1) Using photo fabrication (KPR) techniques, creates the desired internal circuits 43 on one side of a sheet of "A" stage epoxy glass insulation material 45 which is clad on both sides with copper layers 46 (see FIG. 12).

Figure 13:
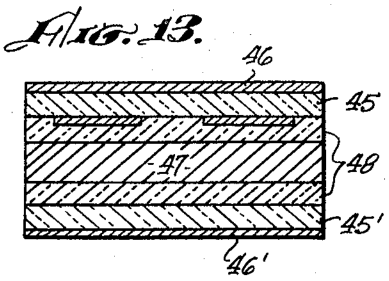
Figure 14:
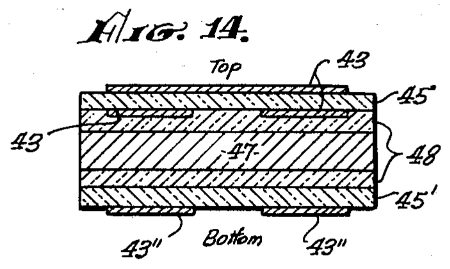

(2) Bond sheet 45 and a sheet of "A" stage epoxy glass insulation material 45′ having one copper clad side 46′ to an aluminum sheet 47 having the same thickness as the height of the desired unitubes 44 (FIG. 13), using two sheets of "B" stage glass epoxy insulation material 48 as the bonding agent. As shown in FIG. 13, the side (lower surface) of sheet 45 having the circuit paths 43 created by step 1 above is adjacent the upper sheet 48.

(3) Using photo fabrication (KPR) techniques create desired circuits 43 and 43″ from the copper clad surfaces 46 and 46′ of sheets 45 and 45′. The top and internal circuits 43 on sheet 45 are the actual circuits, while the bottom circuit 43″ on sheet 45′ functions as a dummy circuit for electroplating control. This step may be performed prior to the bonding procedure of step 2 above, if desired.

Figure 15:
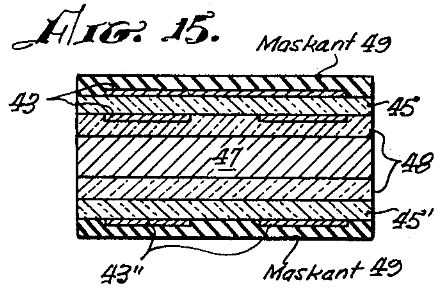

(4) Apply neoprene maskant 49 to the top and bottom surfaces of the bonded assembly as shown in FIG. 15. Trim from edges as necessary.

(5) Drill holes 50 (see FIG. 16) through the bonded assembly, of a size approximately 0.014 inch larger than the inside diameter of the desired unitube 44, at those places requiring a unitube in the circuit. Clean the thus drilled holes.

(6) Electro-copper plate the exposed aluminum surfaces of sheet 47 in holes 50 by a pyrophosphate process to a thickness of approximately 0.0006 inch.

(7) Sensitize the exposed plastic surfaces (maskant 49 and the surfaces of holes 50 in epoxy layers 45, 45′ and 48) by immersion in a suitable conventionally known catalyst.

Figure 17:
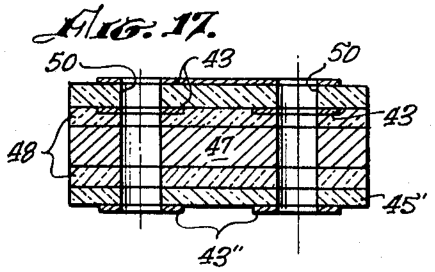

(8) Remove maskant 49 from all surfaces as shown in FIG. 17.

(9) Electroless copper plate all sensitized surfaces of the holes 50 in layers 45, 45′ and 48, the exposed copper surfaces of holes 50 in aluminum sheet 47, and the exposed circuits 43 (both internal and external) and 43″ to a thickness of about 0.0001 inch.

(10) Electro-copper plate all exposed copper surfaces to define a copper layer 51 (see FIG. 21) having a thickness of about 0.0002 inch.

Figure 18:
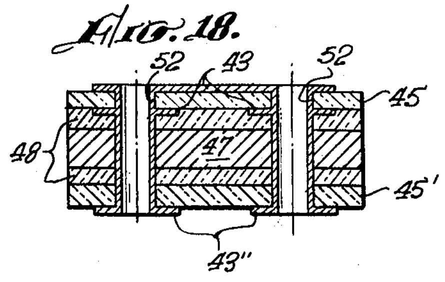
Figure 21:
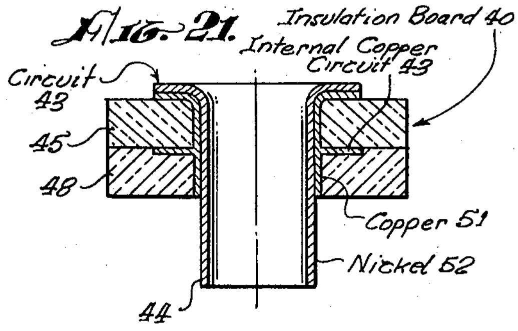
FIG. 21 is an enlarged cross-sectional view of a multi-layer end item made in accordance witht he method illustrated in FIGS. 12–20.

(11) Electro-nickel plate all exposed copper surfaces to define a nickel layer 52 having a thickness of approximately 0.004±0.001 inch (see FIGS. 18 and 21).

Figure 19:
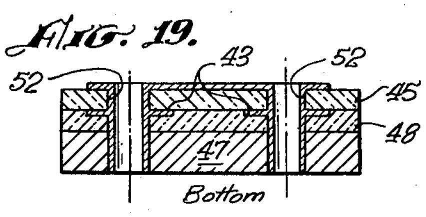
Figure 16:
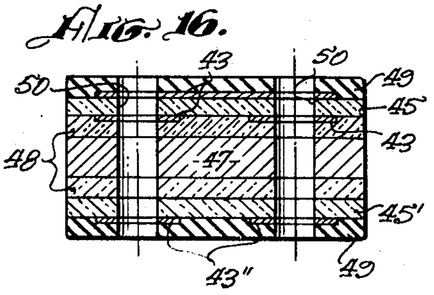

(12) Remove bottom circuits 43″ and adjacent epoxy layers 45′ and 48 to expose the aluminum sheet 47 as shown in FIG. 19. This may, for example, be accomplished by sanding. Remove burrs from the exposed surface and from the ends of the unitube walls.

Figure 20:
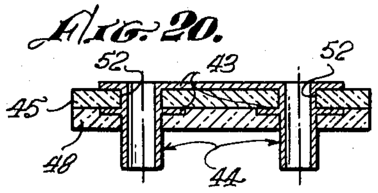

(13) Dissolve aluminum sheet 47 by immersing in sodium hydroxide (see FIG. 20).

(14) Remove exposed copper layer 51 from the outside wall surface of the unitubes 44 (see FIG. 21) by a conventional copper stripping procedure. For example, by immersing in a copper stripper.

Again, and while not set forth specifically, required cleaning and/or rinsing steps are included in the process described above.

The final product illustrated in FIG. 1 is essentially identical with that illustrated in FIG. 11. The configuration of the circuits 43 and the positioning of the unitubes 44 is determined as set forth above with respect to the FIG. 1 embodiment.

The thickness of the positioner board, the number of internal circuits within the board, and the unitube length and diameter are modifications within the scope of this invention and can readily be accomplished by modifying the illustrated manner of carrying out the invention. For example, several layers of circuits can be made by adding combinations of glass epoxy sheets 45 and 45' bonded together by epoxy sheets 48 with internal circuits 43 positioned as desired.

It has thus been shown that the present invention provides an improved method of manufacturing media for attaching electronic components to single-layer and multilayer circuits having the following advantages: (1) regardless of component lead material, the welder electrodes are always in contact with the same type of material, i.e., the nickel, or equivalent material, in the tube wall which reduces sharply the number of variations in weld schedules for a given system; (2) the unitubes are self-aligning with respect to the component leads, eliminating the location and slippage problems which occur when welding round leads to flat ribbon or circuit tabs, and reducing considerably the labor or assembly time; (3) pre-established interconnect circuitry eliminates the possibility of operator-caused wiring errors; (4) the length and diameter of the unitube can be readily varied; and (5) unitube welding gives greater reliability by providing two welds inside each wall, instead of the single tangential weld obtained with other interconnect systems.

The improved method of this invention over the above referenced processes incorporates: (1) a unique manner of providing backing and masking material; (2) a photo fabrication (KPR) technique which allows more dense circuits over previously used silk screening techniques, providing a finer definition of the circuit paths; and (3) use of pyrophosphate copper plating directly on aluminum eliminates the previously used zincate process which provides a smoother more reliable unitube.

While specific types of materials and thicknesses have been set forth hereinbefore, it is understood that other materials and thicknesses which fulfill the requirements may be utilized.

Although particular sequence of primary steps for carrying out the inventive process have been described and partially illustrated, modifications and changes will become apparent to those skilled in the art, and it is intended to cover in the appended claims all such modifications and changes as come within the spirit and scope of this invention.

What we claim is:

1. A method of manufacturing electrical connectors of the type having an integral positioner board, at least one circuit path, and at least one nickel tube-like connector element comprising the steps of: bonding two layers of "A" stage epoxy glass insulation material, having one side thereof clad with copper, to a layer of aluminum, having the same thickness as the height of the desired tube-like connector element, using two layers of "B" stage epoxy glass insulation material as the bonding agent; using photo fabrication techniques, forming at least one circuit path of the same configuration on each of the copper surfaces; applying a maskant to the entire surfaces on which the circuit paths are located; forming apertures through the thus assembled unit at the locations of the desired tube-like connector elements; the apertures having a size larger than the inside diameter of the desired tube-like connector elements; electro-copper plating the exposed aluminum surfaces in the apertures by a pyrophosphate process to a desired thickness; sensitizing the exposed surfaces in the apertures of the epoxy glass layers by the use of a suitable catalyst; removing the maskant from all surfaces, electroless copper plating all sensitized surfaces and the exposed copper surfaces in the apertures and the circuit paths to a desired thickness; electro-copper plating all exposed copper surfaces to define a copper layer of a desired thickness; electro-nickel plating all exposed copper surfaces to define a nickel layer having a thickness of that of the desired tube-like connector element; removing one of the circuit paths, the adjacent epoxy glass layers, and the layers of copper and nickel within the apertures of the removed epoxy glass layers so as to expose the aluminum layer; dissolving the aluminum layer, thereby leaving at least one tube-like connector element extending from the surface of the epoxy glass layers; and removing the exposed copper layer from the outside of the nickel layer, thus producing an integral positioner board, circuit path and tube-like connector element.

2. The method defined in claim 1, wherein the apertures are formed by drilling to a size of about 0.014 inch larger than the inside diameter of the desired tube-like element.

3. The method defined in claim 1, wherein the exposed aluminum surfaces are electro-copper plated to a thickness of about 0.0006 inch.

4. The method defined in claim 1, wherein the sensitized surfaces and the exposed copper surfaces are electroless copper plated to a thickness of about 0.0001 inch.

5. The method defined in claim 1, wherein the electro-copper plating step of the exposed copper surfaces provides the copper layer with a thickness of about 0.0002 inch.

6. The method defined in claim 1, wherein the electro-nickel plating step produces a nickel layer having a thickness of about 0.004±0.001 inch.

7. The method defined in claim 1, wherein the step of forming at least one circuit path on each of the copper surfaces precedes the step of bonding the various layers together.

8. A method of manufacturing electrical connectors of the type having an integral positioner board, multi-layer circuits, and a plurality of nickel tube-like connector elements comprising the steps of: creating at least one internal circuit on one side of a layer of "A" stage epoxy glass insulation material having both sides thereof clad with copper; bonding the double copper clad epoxy glass layer and a layer of "A" stage epoxy glass insulation material, having one side thereof clad with copper, to an aluminum layer, having the same thickness as the height of the desired tube-like connector elements, using two layers of "B" stage epoxy glass insulation material as the bonding agent, such that the previously created internal circuit is adjacent the bonding material; using photo fabrication techniques, creating the desired circuit paths on each of the copper clad surfaces; applying maskant to the entire surfaces on which the circuit paths are located; forming holes through the bonded assembly at the places requiring tube-like connector elements, the size of the holes being about 0.014 inch larger than the inside diameter of the desired tube-like connector elements; electro-copper plating the exposed aluminum surfaces by a pyrophosphate process; sensitizing the exposed epoxy glass surfaces; removing the maskant; electroless copper plating all sensitized surfaces and the exposed copper surfaces of the holes and circuit paths to a desired thickness; electro-copper plating all exposed copper surfaces to a desired thickness; electro-nickel plating all exposed copper surfaces to define a nickel layer of a desired thickness; removing the single copper clad epoxy glass layer, the adjacent bonding layer, and the layers of copper and nickel within the holes of the removed layers so as to expose the aluminum layer, dissolving the aluminum layer; and removing the copper layer from around the projecting portion of the nickel layer, thereby producing an integral positioner board, multi-circuit, and tube-like connector elements.

9. The method defined in claim 8, wherein electro-copper plating step of the aluminum surfaces provides a copper thickness of about 0.0006 inch; the electroless copper plating step provides a copper thickness of about 0.0001 inch; and the electro-copper plating step of all exposed copper surfaces provides a copper layer thickness of about 0.0002 inch.

10. The method defined in claim 8, wherein the electro-nickel plating step provides a nickel layer having a thickness of about 0.004±0.001 inch.

References Cited

UNITED STATES PATENTS

| | | | |
|---|---|---|---|
| 3,011,920 | 12/1961 | Shipley | 117—213 |
| 3,040,426 | 6/1962 | Hamren. | |
| 3,102,213 | 8/1963 | Bedson et al. | 317—101 X |
| 3,163,588 | 12/1964 | Shortt et al. | 29—625 X |
| 3,261,769 | 7/1966 | Coe et al. | |
| 3,345,741 | 10/1967 | Reimann | 29—625 |
| 3,357,099 | 12/1967 | Nagy et al. | 29—625 |

JOHN F. CAMPBELL, *Primary Examiner.*

D. C. REILEY, *Assistant Examiner.*

U.S. Cl. X.R.

29—423, 527, 626